United States Patent [19]

Shwayder

[11] Patent Number: 4,544,116
[45] Date of Patent: Oct. 1, 1985

[54] HELICOPTER LANDING SKID SHOE PAD

[76] Inventor: Warren M. Shwayder, 2335 E. Lincoln, Birmingham, Mich. 48008

[21] Appl. No.: 550,778

[22] Filed: Nov. 14, 1983

[51] Int. Cl.⁴ ............................................. B64C 25/52
[52] U.S. Cl. ................................................ 244/108
[58] Field of Search ...................... 244/108, 109, 17.11, 244/17.17, 111; 188/251 M, 5, 250 B, 255; 419/14; 420/469; 280/12

[56] References Cited

U.S. PATENT DOCUMENTS

| | | | |
|---|---|---|---|
| 2,784,105 | 3/1957 | Stedman et al. | 188/251 M |
| 2,877,969 | 3/1959 | Dowty | 188/5 |
| 3,104,084 | 9/1963 | Lovercheck | 244/108 |
| 3,117,845 | 1/1964 | Reed | 244/108 |
| 3,149,411 | 9/1964 | Smiley et al. | 419/14 |
| 3,154,270 | 10/1964 | Jensen | 244/17.17 |
| 3,936,018 | 2/1976 | Barlow | 244/136 |
| 4,000,980 | 1/1977 | Morishita | 419/14 |
| 4,196,878 | 4/1980 | Michel | 244/17.17 |

*Primary Examiner*—Galen L. Barefoot
*Attorney, Agent, or Firm*—Cullen, Sloman, Cantor, Grauer, Scott and Rutherford

[57] ABSTRACT

A shoe pad for helicopter landing gear skids is formed of an elongated, flattened, narrow, thin wall steel channel which is inverted so that it opens downwardly. The channel is filled with a matrix of hard metal carbide and a binder of soft, ductile, somewhat resilient, cuperous metal. The base of the channel is welded to a shoe strip which is fastened to the bottom surface of a skid. The exposed matrix contacts the ground in landings and take-offs, and tends to absorb impacts, reduce drag friction with the ground and dissipate friction caused heat, thereby materially reducing skid and skid shoe damage and wear.

6 Claims, 8 Drawing Figures

U.S. Patent   Oct. 1, 1985   4,544,116

HELICOPTER LANDING SKID SHOE PAD

BACKGROUND OF INVENTION

This invention relates to an improved landing shoe pad for helicopter landing gear skids.

A conventional skid-type landing gear used on helicopters, comprises a pair of elongated tubular ski-like skids which are fastened to the fuselage by means of struts. The skids are located beneath the helicopter and, in essence, form a pair of parallel tracks upon which the helicopter can land and be supported. In addition, during forward or rearward movement of the helicopter upon the ground or runway, the skids may engage the ground for short times, functioning like skis.

Because the skids of the helicopter landing gear frequently are in moving contact with the ground or runway, they wear out rapidly, particularly due to the high friction generated during such contact. Thus, attempts have been made in the past to protect the ground-engaging surfaces of the skids to increase their life. Thus, shoes or channels have been fastened to the bottoms of the skids and in some cases, steel bars have been fastened along the lengths of the channels to act as steel edged ground contacting rails. However, this shoe and pad construction, although lasting longer than the unprotected skid, also wears rapidly and additionally, tends to crack or break under impacts.

Thus, the invention herein relates to an improved pad which very materially increases the wear life of the skid and the skid shoe and also tends to reduce impact caused cracking or breaking of the landing gear, the skid and the pad. It also, unexpectedly, has an effect in reducing the friction due to the ground-engaging contact.

SUMMARY OF INVENTION

The invention herein contemplates forming a shoe pad out of a shallow, elongated, narrow channel formed of steel which opens downwardly. The base of the channel is attached, such as by welding, to the helicopter skid or skid shoe. The channel is filled with a matrix formed of closely packed irregular shaped particles of hard metal carbides embedded in and surrounded by a cuperous metal, such as brazing metal, which is relatively soft, ductile, somewhat resilient and highly heat conductive.

This pad, when secured to the bottom, ground-engaging surface of the skid, will absorb ground impacts due to the movement of the particles within the softer and ductile binder and yet, will preserve its solid and dimensional integrity because of the somewhat resilient characteristics of the binder. Moreover, it resists breakage or cracking because the particles will displace rather than crack. Further, the matrix, unexpectedly, has a tendency of reducing friction in contacting the ground, probably because the particles have only point or limited line contact with the ground and the binder tends to act as a slippery lubricant.

A major object of the invention is to provide relatively inexpensive shoe pads which will have a very substantial effect upon improving the life and reducing the wear of the skids. For example, it has been found that about ten times the life is obtained out of the pads of this invention as compared to prior devices.

These and other objects and advantages of this invention will become apparent upon reading the following disclosure, of which the attached drawings form a part.

DETAILED DESCRIPTION

Figure 1:
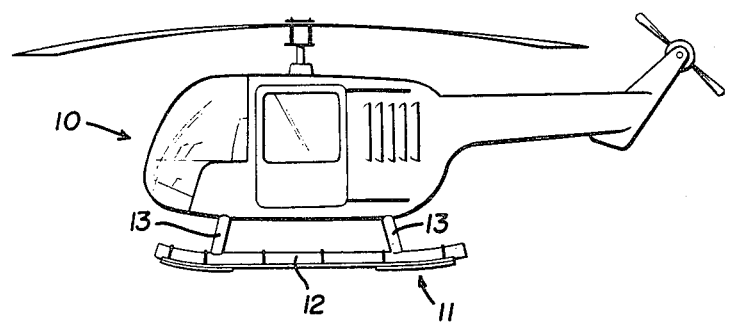
FIG. 1 is a schematic illustration of a conventional helicopter with the skid-type landing gear.
Figure 2:
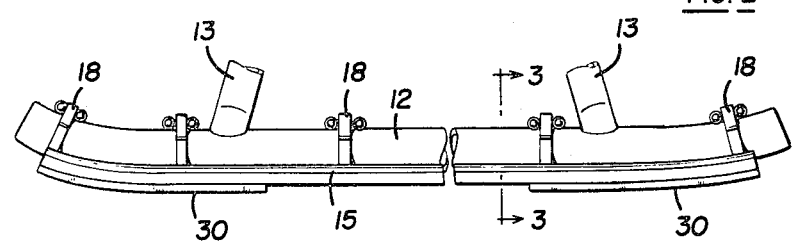
FIG. 2 is an elevational, schematic view of one landing gear skid with the shoe and shoe pad in place.
Figure 3:
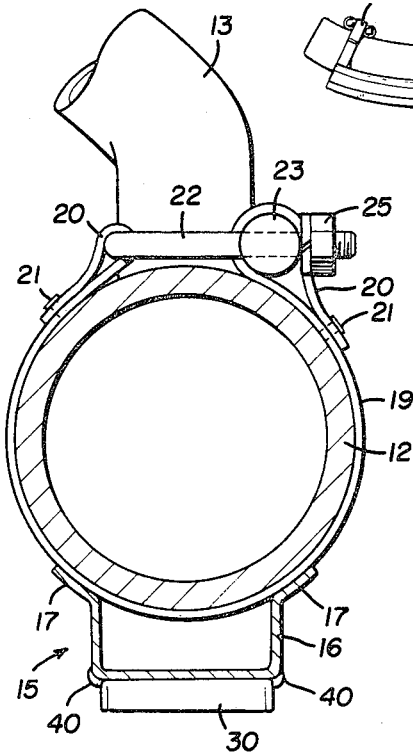
FIG. 3 is an enlarged, cross-sectional view taken in the direction of arrows 3—3 of FIG. 2, showing the shoe and shoe pad secured to the skid by a strap-type clamp.

FIG. 1 illustrates a typical helicopter 10 having a skid-type landing gear 11 which is made of a pair of horizontally elongated ski-like skids 12 fastened together and to the helicopter fuselage with struts 13. The actual landing gear may include more parts, but is illustrated schematically here since the skid is all that is pertinent to this application.

A channel-shaped shoe 15 is fastened along the bottom, ground-engaging, surface of the tubular strut 13. This shoe, which may be formed of sheet metal, such as of suitable steel, is formed of a lower U-shaped channel 16 having curved flanges 17 which are curved to the contour of the skid. That is, if the skid is formed of a circular tube, the flanges are formed as segments of a circle.

The shoe is fastened to the skid by means of strap clamps 18 or some other suitable type of fastener for mechanically securing the shoe to the skid.

For purposes of illustration, the fastener clamps 18 are formed of steel straps 19. The upper ends of the straps are reversely bent into loops 20 whose free ends are secured to the body of the straps by a suitable mechanical fastener 21, which could be spot welds or rivets or the like. A U-shaped shackle or U-bolt 22 has its base inserted through one of the loops 20 so that its legs extend through a bar 23 which is positioned within the opposite loop. Holes 24 in the bar receive the legs. Bolts 25 engage the ends of the shackle for tightly clamping the strap around the skid.

Figure 5:
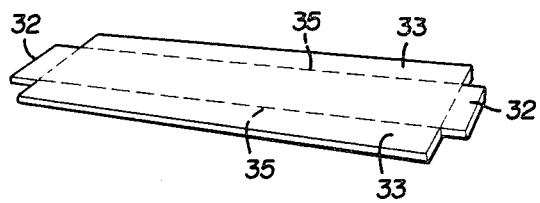
FIG. 5 is a perspective view, to a reduced scale, showing the steel, sheet metal blank which is used to make the channel for the pad.

The shoe pad 30 is fastened to the bottom or base of the U-shaped channel 16 of the shoe. The pad may be formed of a rectangular sheet metal blank 31 whose corners are notched to form opposite ends 32, sides 33 and a base 34. By bending the sides and ends along the dotted lines 35 illustrated in FIG. 5, the narrow, shallow, closed end channel is formed.

Although the thickness of the metal for the channel may vary, a suitable thickness is roughly in the range of 1/16th of an inch with the channel being formed of mild or low carbon steel. When the sides and ends are bent relative to the dotted lines 35, the free edges of these elements may be welded together to form a secure channel.

The channel may be bent along one end 36, to resemble a ski and to thus, conform to the bent ends of the skid. As can be seen in the illustration, the pad normally is made to cover only a portion of the skid. For example, if the skid is about ten feet in length, a pad of about 30 inches will suffice for each of the opposite ends of the skid. The space between the pads can be left open, or alternatively, the space can be filled with hard steel bars or the like.

The channel is filled with a matrix 37 formed of generally irregularly shaped particles 38 of a hard metal carbide, such as cemented tungsten carbide, tantalum or titanium carbide and the like. Such particles of tungsten carbide typically are formed with about 6-13% cobalt. The size of the particles may vary considerably, but it has been found that particles in the range of $-6$ to $+40$ mesh are satisfactory. Other sizes may be used, as for example:

The particles are embedded and generally surrounded by a binder 39 preferably is formed of a cuperous material, such as commercially pure copper or bronze or other metal which has a high copper content. The matrix may be formed in the channel by pouring in the particles and the molten binder to solidify in place.

Figure 4:
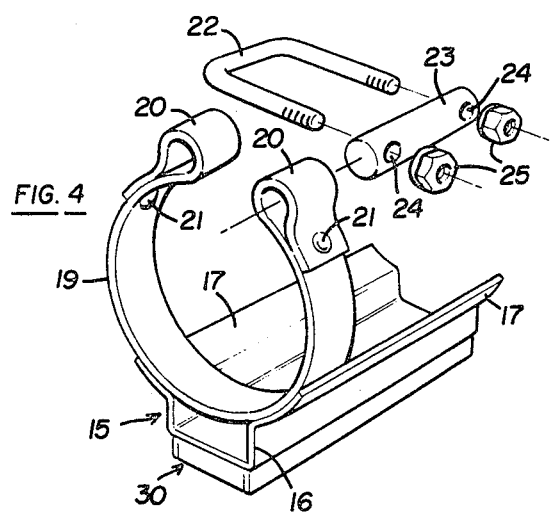
FIG. 4 is a perspective view, partially disassembled, showing the clamping means for securing the shoe to the skid.

When the pads are to be used, they are positioned against the U-shaped channel 16 of the shoe 15 and secured in place by a weld bead 40 (see FIG. 4). Conversely, replacement of the pad involves melting or breaking the weld bead.

Figure 8:
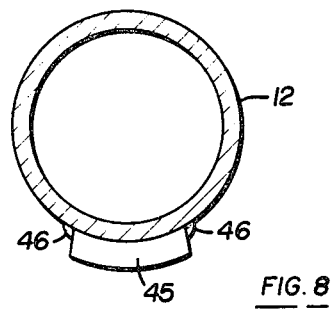
FIG. 8 schematically shows another form of mounting the pad to the skid.

The pad may be secured to the bottom of the skid in other ways than that shown above. Thus, by way of example, FIG. 8 shows a skid 11 with the shoe pad 45 applied directly to the bottom surface of the skid and welded in place by weld beads 46. Here, the shoe is curved somewhat to accommodate to the curvature of the bottom surface of the skid.

Figure 6:
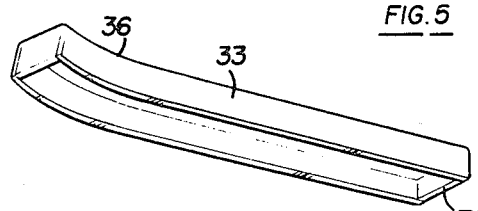
FIG. 6 is a perspective view, looking upwardly, of the assembled channel.

Also, as mentioned above, when the ends and sides of the sheet metal blank 31 are bent into the form of the channel, as shown in FIG. 6, the welding of the corners of the channel can be accomplished at the same time as the mounting of the pad upon the shoe. Thus, the welding labor can be reduced by performing that step at the same time as when the pad is mounted.

Figure 7:
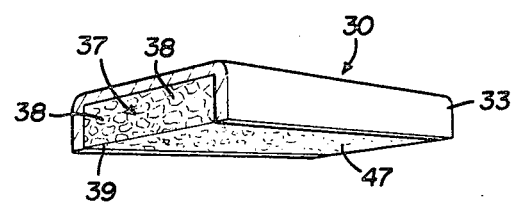
FIG. 7 is a cross-sectional, perspective view showing the bottom of the pad.

As shown in FIG. 7, the exposed or open face of the channel exposes a narrow, thin, line of matrix which contacts the ground during moving engagement between the skid and the ground or runway. Because of the irregularity of, and random packing of the particles, they tend to contact the ground either by point contact or limited area or line contact. Moreover, between the particles, the contact is made with the copper or copper-like binder material.

It has been found that the exposed face 47 of the matrix has a lower frictional contact with the ground than would be expected. This may be due to the limited contact between the hard particles and the ground and to the ductile binder material acting as a lubricant. During such contact, however, the channel walls or legs tends to maintain the matrix against shifting sideways or otherwise cracking or breaking. In addition, impacts with the ground are absorbed to a considerable extent by the matrix because of what appears to be relative movement of the particles within the matrix mass. That is, the particles appear to shift momentarily to displace the binder which tends to absorb and resiliently return the particles.

While the particles are relatively brittle, surprisingly, there is no apparent breakage of the particles due to impact, probably because of the ability of the particles to move within the yielding binder for thus, absorbing impact.

It has been found that the pads tend to have at least triple the life of the steel bars previously used and many more times that of the life of the unprotected shoes or skids. Aside from the reduction in wear due to friction, there is also a considerable reduction in landing gear damage or cracking when these pads are used because of the impact absorbing nature of the pads. It is probable that damage and friction-caused wear is also materially reduced by the high heat conductivity of the binder which rapidly dissipates the heat resulting from ground contact.

Having fully described an operative embodiment of this invention, I now claim:

1. For use with a helicopter landing skid which is formed of a horizontally elongated tube arranged beneath and secured to the helicopter so that the skid engages and supports the helicopter upon the ground, the skid including an elongated upwardly opening first channel secured to the underside of the tube, the improvement of a plurality of shoe pads, each comprising:
   a narrow, horizontally elongated, shallow depth, U-shaped channel formed of thin, stiff sheet metal;
   the U-shaped channel being inverted so that its legs extend downwardly from its base and it opens downwardly;
   the U-shaped channel being filled with a solid matrix of closely packed, generally irregular shaped particles of hard metal carbide embedded in a binder of relatively soft, ductile, somewhat resilient, high heat conductive metal;
   the matrix being exposed at the U-shaped channel opening to form an elongated, substantially flat, narrow, ground-engaging surface;
   means for fastening the base of the U-shaped channel to the bottom of the first channel of the skid so that the U-shaped channel extends along a substantial portion of the skid;
   whereby the pad materially reduces skid damage and skid wear due to frictional contact between the skid and ground or runway, and the matrix tends to absorb ground impacts and to reduce the ground contact friction and to dissipate friction caused by heat.

2. A shoe pad as defined in claim 1, and said binder being formed of commercially pure copper.

3. A shoe pad as defined in claim 1, and including the opposite ends of U-shaped channel being closed.

4. In a skid shoe for attachment to the bottom edge of a horizontally elongated, helicopter landing skid and including an elongated narrow metal strip and means for fastening the strip to the bottom of the skid with the strip extending along the length of the skid, said strip formed as an elongated, upwardly opening first channel, a plurality of shoe pads, each shoe pad comprising:
   a thin wall, steel second channel, which is narrow, and horizontally elongated and has a generally flattened base with relatively short, integral legs extending downwardly from the base;
   the base being welded to the first channel strip with the second channel arranged to open downwardly and overlapping a portion of the length of the skid near one end thereof;

a solid matrix filling the second channel and being exposed at the bottom, open face of the second channel;

said matrix being formed of closely packed, generally irregularly shaped, particles of cemented hard metal carbide embedded within a binder of a soft, ductile, somewhat resilient, high heat conductive cuperous-like metal;

whereby the pad engages the ground or runway during landings and take-offs to materially reduce landing gear and skid damage and wear, otherwise resulting from high frictional drag and frictionally caused heat due to moving contact between the landing skid ground-engaging surface;

and with the matrix tending to absorb ground impact by displacement of the particles within the binder and with the tendency of the binder to resiliently recover, and with the binder and the ground-engaging portion of the particles tending to reduce friction due to sliding upon the ground and the matrix tending to dissipate friction caused heat.

5. A construction as defined in claim 4, and said binder being formed substantially of commercially pure copper.

6. A construction as defined in claim 4, and with the opposite ends of the second channel being closed.

* * * * *